March 30, 1965   F. PAPKE ETAL   3,175,457
ALBADA VIEWFINDER WITH INTEGRAL REFLECTOR AND
LENS MEANS FOR VIEWING EXTERNAL POINTER
Filed June 1, 1960   2 Sheets-Sheet 1

INVENTORS
Friedrich Papke
Wilhelm Reiche
Paul Greger

By
Blum, Moscovitz, Friedman + Blum
Attorneys

March 30, 1965   F. PAPKE ETAL   3,175,457
ALBADA VIEWFINDER WITH INTEGRAL REFLECTOR AND
LENS MEANS FOR VIEWING EXTERNAL POINTER
Filed June 1, 1960   2 Sheets-Sheet 2
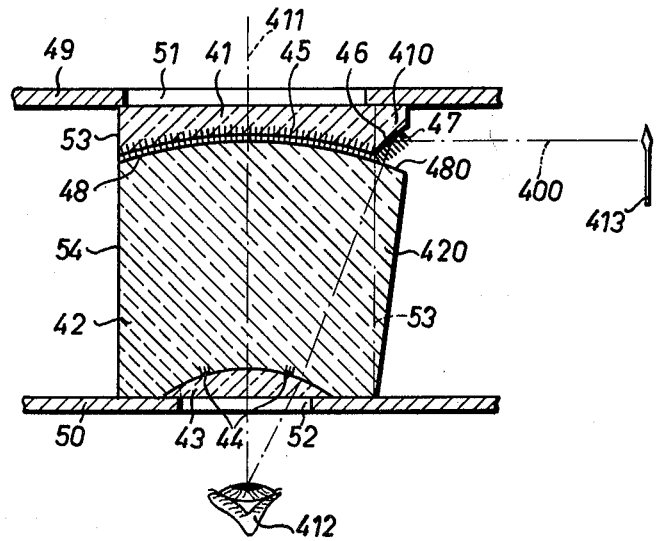
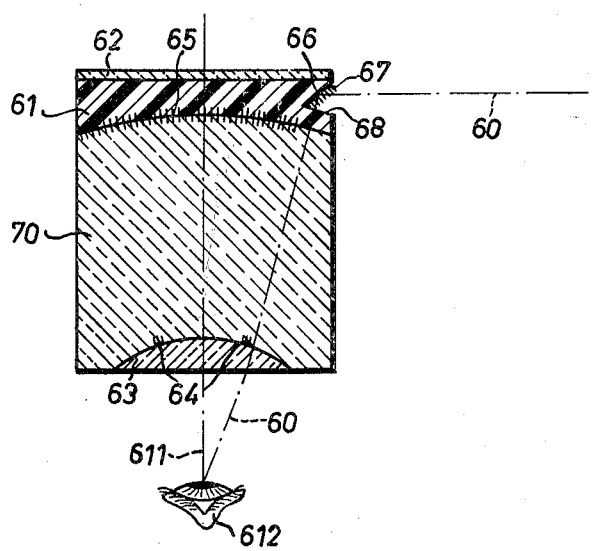
INVENTORS
Friedrich Papke
Wilhelm Reiche
Paul Greger
By
Blum, Moscovitz, Friedman & Blum
Attorneys

United States Patent Office 3,175,457
Patented Mar. 30, 1965

3,175,457
ALBADA VIEWFINDER WITH INTEGRAL REFLECTOR AND LENS MEANS FOR VIEWING EXTERNAL POINTER
Friedrich Papke and Wilhelm Reiche, Braunschweig, Gliesmaroder, and Paul Greger, Braunschweig, Germany, assignors to Voigtländer A.G., Braunschweig, Germany, a corporation of Germany
Filed June 1, 1960, Ser. No. 33,198
Claims priority, application Germany, June 3, 1959, V 16,634
9 Claims. (Cl. 88—1.5)

This invention relates to viewfinders for photographic cameras and, more particularly, to an improved viewfinder of the type generally known as an "Albada" viewfinder, and incorporating simplified and economical means for providing, within the field of view of the viewfinder, images of the positions of exposure condition indicating elements of the camera extraneous to the viewfinder.

An "Albada" viewfinder is well known to those skilled in the photographic art as comprising a forward element, usually a plano-concave lens having superposed on its concave inner face, a semi-permeable or semi-transparent mirror arranged to reflect at infinity the image of a picture limiting frame superposed on the convex surface of an ocular or eyepiece, this convex surface facing and being axially spaced from the semi-permeable mirror. In the so-called "block" construction of the "Albada" viewfinder, the ocular may be a plano-convex lens or may be a regular convex lens, and the limiting frame is cemented between the inner convex surface of the viewing lens and a concave surface of a main body member, block, or central lens disposed between the forward lens and the ocular and having a convex surface facing the semi-permeable mirror and cemented, at least in part, to the concave surface of the forward lens.

Various arrangements have been proposed for providing, within or immediately adjacent to this limiting frame, image or images of the position of various elementts of exposure condition indicating the camera. Generally, these known arrangements have involved relatively complicated, bulky and expensive optical systems. One such arrangement, which has been satisfactory in operation, has involved additional optical elements cemented or otherwise secured in projecting relation to the "Albada" viewfinder. While this arrangement is satisfactory in operation, it has been complicated and expensive to construct and assemble, and has generally been of such relatively high cost as to be non-economical.

In accordance with the present invention, a novel arrangement equivalent operationally to the aforementioned arrangement is provided without the securing or cementing of projecting optical elements to the viewfinder. More particularly, in accordance with one embodiment of the present invention, the concave inner face of the front or forward lens of the viewfinder is formed, adjacent an end thereof, with a planar bevelled or oblique surface diverging from the concave surface toward the outer planar surface of the element, and a mirror is provided on this bevelled surface either by cementing thereto or by formation thereon, as by vacuum deposition of metal. The angle of the oblique surface is so selected that the image of an exposure condition indicating element of the camera, such as the pointer of an exposure meter, is reflected by this mirror, through the portion of the convex surface of the body member facing this latter viewer, into the viewing lens preferably outside the frame of the viewfinder, and in such manner that the image is focused at the viewing point where the eye of an observer is normally positioned for looking through the viewfinder. Thus, an observer looking through the viewfinder will see not only the image to be photographed, as defined by the frame, but also, just outside this frame, an image of the position of the exposure indicating element of the camera whose position it is desired to be observable in the viewfinder.

This arrangement may be used, for example, with the normal "Albada" finder in which the inner concave surface of the front lens and the outer convex surface of the main body, or central lens, are substantially juxtaposed to each other except for the disposition of the semipermeable mirror therebetween. It may also be used with the modified form of this viewfinder, known as an "Albada-Newton" viewfinder in which the intermediate portion of the concave inner surface of the front lens has a sharper degree of curvature than the outer portions thereof, and which latter coincide with the curvature of the convex outer surface on the block or central lens, this modified viewfinder, having a convex viewing lens, whereas the more usual "Albada" finder has a plano-convex viewing lens. In this modified viewfinder, there is thus a gap between the concave and convex surfaces, respectively of the outer element and the body, along the intermediate portions of their lengths.

The invention may also be practised by making the viewfinder front lens and body asymmetric about their optical axis so that this front lens and the body extend to a greater extent in one direction from the optical axis than in the opposite direction. In this instance, the bevelled or oblique surface on the front lens is formed on that portion thereof constituting the differential between the longer side of the front element and the shorter side thereof. The convex surface of the body or central lens extends a sufficient distance in alignment with the oblique mirror for rays from the mirror to enter such convex surface, and the body may be gradually tapered back to its normal dimension adjacent its end having the eye piece cemented therein.

As a further modification, one end edge of the front lens may be formed with an essentially V slot therein, one side of the V being an arcuate surface parallel and preferably fairly close to the concave surface of the front lens and the other surface of the V being the bevelled or oblique mirrored surface. In this embodiment, the front lens is preferably of transparent plastic.

In each embodiment of the invention, the bevelled surface may be produced in any desired manner, such as by pressing or grinding. Furthermore, the mirror either may be secured to the bevelled surface or may be formed thereon as by vaporization or deposition of reflecting material.

For an understanding of the principles of the invention, reference is made to the following description of typical embodiments thereof as illustrated in the accompanying drawings. In the drawings:

FIG. 3 is a view similar to FIGS. 1 and 2 illustrating the invention as incorporated in a viewfinder of the "Albada" type, and in which the elements of the viewfinder are asymmetrical with respect to the optical axis; and FIG. 4 is a view, similar to FIGS. 1, 2, and 3, illustrating a modified form of the invention as incorporated in a viewfinder of the "Albada" type.

Figure 1:
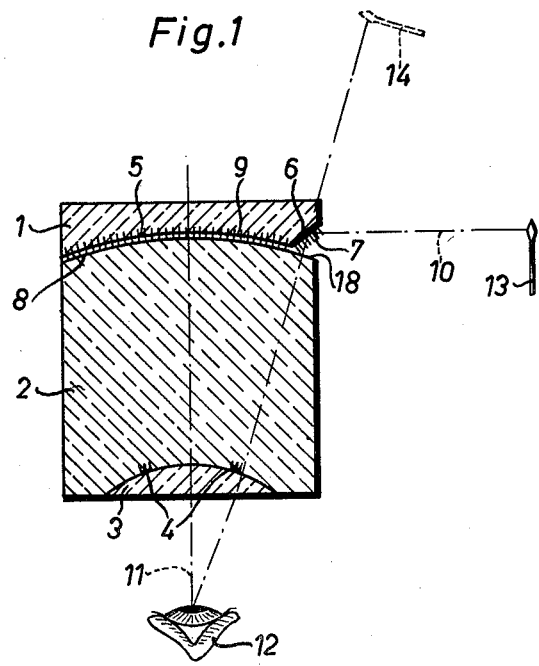
FIG. 1 is a sectional view of a viewfinder of the "Albada" type, with the indicating element of the camera and the path of light rays therefrom being shown schematically.

Referring to FIG. 1, there is therein illustrated a viewfinder of the "Albada" type, of "block" construction, which is conventional except for the modification in accordance with the present invention. In a known manner, this block type viewfinder comprises a front plano-concave lens 1, body or central lens 2, and a plano-convex ocular or eye-piece 3. The usual picture limiting frame 4 is disposed between the inner convex surface of ocular 3 and the mating concave portion of the outer surface of block 2, these surfaces being cemented together with the frame disposed therebetween. Also in accordance with the usual construction of this type of viewfinder, a semi-transparent or semi-permeable mirror 5 is disposed between the convex outer surface 8 of block 2 and the concave inner surface 9 of front lens 1, this mirror being preferably cemented to the concave surface 9 and the concave and convex mating surfaces being cemented together. The several convex and concave surfaces are, in the usual case, spherical surfaces.

In accordance with the present invention, there is provided on the front lens 1 an oblique or bevelled surface 6 adjacent the outer edge of concave surface 9. As viewed in FIG. 1, this bevelled surface 6 extends inwardly toward the optical axis 11 of the lens and toward the ocular 3. In the embodiment shown in FIG. 1, this bevelled or sloping surface 6 extends the complete distance from the outer edge of lens 1 to the concave surface 9 thereof. A full mirror 7 is arranged on this surface 6, as by cementing thereon or being formed thereon by metal vaporization in a high vacuum. The convex surface 8 of the block 2 extends, to the extent of the projection of the surface 6, beyond the concave surface 9 of the member 1, this extent being indicated at 18.

With this arrangement, a light beam 10 coming from a direction approximately at right angles to the optical axis 11, and representing the light from an exposure meter indicator or pointer 13, for example, strikes the mirror 7 and, being reflected thereby, enters through the part 18 of the convex surface 8 of block 2, passes through the block 2 and the ocular 3, and enters the eye 12 of the user. The composite structure comprising block 2 and ocular 3, with its spherical intersurface struck by the ray 10, acts as a positive lens. The refractive value is so selected that the pointer 13 appears in the focal plane of the ocular lens 3. In the eye 12 of the viewer, the image of object 13, in a known manner, appears to be focused at infinity and thus its virtual image 14 lies to one side of the field of view of the viewfinder. This is desirable, since it makes the reflector pointer 13 easily recognizable, and also the reflected image of the pointer does not otherwise interfere with the viewing of the picture proper.

In order to assure this, the angle of the surface 6 and the mirror 7 with respect to the optical axis 11, and the refractive power of the body 2 with the free surface 18, are so selected that the virtual image of the object which is to be reflected by the mirror 7 appears outside the frame 4 delineating the picture field of the viewfinder. The proper selection of dimensions and other characteristics to effect this are within the ability of those skilled in the art and would not involve invention. Accordingly, it is not deemed necessary to set forth herein the method of calculation in arriving at these factors.

However, tests and findings, made during the creation and development of the invention, indicate that it is advantageous that the angle of the oblique mirror 7 should be between 20 degrees and 65 degrees with respect to the optical axis 11. The glass or plastic from which the positive lenses 2 and 3 are made should advantageously be selected with an average refractive index for yellow light of 1.4 to 1.7. The radius of curvature of surface 8 should be preferably between 20 mm. and 70 mm.

It is also possible to modify the radii of the curved surfaces of the elements 1 and 2, within certain limits in accordance with certain known optical-geometrical laws, to adapt them, as well as the focal length of the block 2 acting as a lens through its surface 8, to the existing structural features of any particular camera construction. Also, it is within the scope of the invention to direct the reflected image into the frame 4 or into the image field visible through this frame, if such is desirable in any particular instance. When this is done, scales and/or appropriate markings, of importance for the reading or judging of adjusted values, can be provided on the frame 4.

It will be noted that, as illustrated in FIG. 1, the element whose position or adjustment is to be reflected is positioned to the right of the viewfinder, considering the direction of viewing from the viewer's eye as a starting point. However, it will be understood that it is also possible to use the same arrangement to provide an image of the position of an indicating element located to the left of the viewfinder, above the viewfinder, or below the viewfinder, so that the arrangement is adaptable in accordance with the arrangement of the viewfinder and of the camera elements, whose position it is desired to reflect into the viewfinder. In certain instances, it may be necessary or desirable to use other optical components, arranged outside the viewfinder or spaced therefrom, to direct the image of a particular element onto the mirror 7. For example, such components may comprise mirrors, lenses, prisms, etc. In each case, it is desirable that sufficient illumination be provided on the element whose position is to be reflected so that there is sufficient contrast of the image as appearing in the viewfinder.

It is also within the scope of the invention to provide the portion 18 of the convex surface 8 with a semi-transparent or semi-permeable mirror. In this instance, the semi-transparent or semi-permeable mirror 5, as illustrated in FIG. 1, would not be applied to the concave surface of the lens 1 but rather to the convex surface 8 of the body 2. This particular feature has the advantage, on the one hand, that the semi-transparent mirror surface 5 is not reduced in size for reflecting of the frame. On the other hand, the reflected beam 10 would be weakened in its intensity.

It should be noted that the "Albada" type of viewfinder shown in FIG. 1, modified in accordance with the invention, is intended primarily for producing an image at full scale, that is at a ratio of 1:1. However, the invention can be just as easily applied to a viewfinder of the general "Albada" type in which the magnification ratio is other than 1:1, such as one in which the ratio is reduced and which further incorporates the principle of a "Newton" viewfinder. Such an arrangement is shown in FIG. 2.

Figure 2:
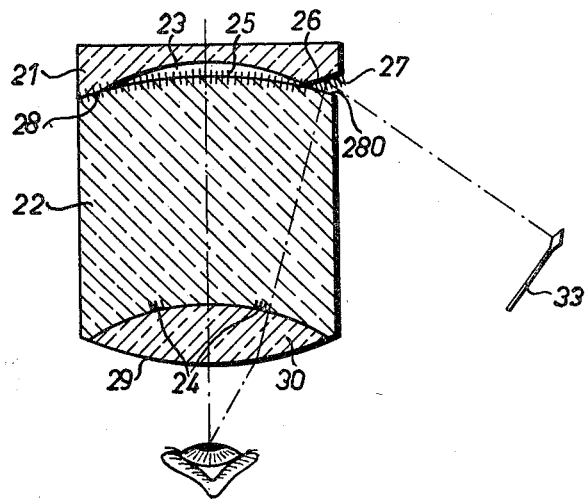
FIG. 2 is a view similar to FIG. 1, illustrating the invention as incorporated in a viewfinder of the "Albada-Newton" type.

Referring to FIG. 2, a viewfinder of the "Albada-Newton" type is shown. In this viewfinder, the major portion of the inner surface of the lens 21 is concave to a sharper radius than that of the convex surface 28 of the block 22, so that an air gap 23 is provided between the inner or intermediate part of the concave surface of lens 21 and the convex surface 28 of block 22. The semi-transparent or semi-permeable mirror 25 is seated on the convex surface 28, being suitably cemented thereto, and the lens member 21 is cemented to the block 22 which also has cemented thereto the ocular 30. This ocular 30 has two convex surfaces, the outer one being indicated at 29 and the inner one seating in a suitable concave surface portion on the outer end of the block 22. Lens 30 is cemented to this latter concave surface portion, with the frame 24 being positioned between lens 30 and block 22 and cemented into position.

As in FIG. 1, an oblique or bevelled surface 26 is provided on the inner surface of lens 21, this surface 26 extending outwardly from the junction of the more sharply concave portion of the surface of lens 21 with the convex surface 28 of block 22. It will be noted that the angle between surface 26 and the portion 280 of surface 28 extending in light receiving relation to the surface 26 is less than the corresponding angle between the surfaces 6 and 18 of FIG. 1. As in FIG. 1, a full mirror 27 is provided on the surface 26, being either cemented thereto or formed thereon by metal vaporization in a vacuum, and the surface 26 may be made by any desired process, such as pressing or grinding.

With this arrangement, the combination of the block 28 and the lens 30 focuses the frame 24 approximately at infinity. The observed object again is illustrated, solely by way of example, as the indicator 33 of an exposure meter, the rays of light from which strike the mirror 27 at such an angle that they are reflected through the portion 280 of surface 28 and thence through body 22 and lens 30 to the eye, the image appearing outside the frame 24, although it may be made to appear inside the frame 24 if necessary or desirable.

In both the embodiments shown in FIG. 1 and that shown in FIG. 2, it should be noted that, while the oblique or bevelled surfaces 6 or 26 are developed or shown generally as flat surfaces, these may be spherical, cylindrical, or aspherical surfaces if it is desired to supplement the action of the lenses 18 or 280, such as to increase or reduce the refractive index of the optical elements, to remove distortion from the image, etc.

The invention may also be embodied in a modified form of "Albada" viewfinder in which the optical elements are asymmetrical with respect to the optical axis, as shown, more particularly, in FIG. 3. Referring to this figure, the plano-concave front lens is indicated at 41, the central lens or block at 42, and the plano-convex ocular lens at 43, these three elements preferably being cemented together with a frame 44 being secured between body 42 and ocular 43. A semi-permeable or semi-transparent mirror 45 is secured between the inner concave surface of lens 41 and the convex surface 48 of body 42, preferably being cemented to the inner concave surface of lens 41.

That portion of the concave surface of lens 41 and the convex surface 48 having the mirror 45 disposed therebetween, as well as the mirror itself, are symmetrical with respect to the optical axis 411 of the viewfinder. Also, the ocular 44 is symmetrical with respect to this optical axis, as are also the upper and lower mounts 49 and 50, respectively, having the openings 51 and 52, respectively. While these are illustrated as openings, plano-parallel sided glass plates could be inserted in the openings.

As viewed in FIG. 3, the left sides 53 and 54 of lens 41 and body 42, respectively, extend linearly and approximately parallel to the optical axis 411. The dotted line 53 represents the imaginary limit of the viewfinder on the right side, if the elements were all symmetrical with respect to the optical axis 411.

It will be noted, however, that in this embodiment of the invention, both the front lens 41 and the block 42 extend beyond this imaginary line of symmetry 53. The extended, or asymmetric, portion of lens 41 is indicated at 410 and the extended, or asymmetric, portion of body 42 is indicated at 420. Both extensions, 410 and 420, preferably are integral with the respective elements 41 and 42. The oblique or bevelled surface 46 is formed on the extended portion 410, by pressing or grinding or any other similar operation, and extends downwardly and inwardly, as viewed in FIG. 3, to about the right hand line 53. This bevelled surface carries a mirror 47, as in the case of FIGS. 1 and 2. Opposite mirror 47 the curved convex surface 48 of body 42 is extended, as indicated at 480, the side extension 420 being indicated as a bevelled or wedge-shaped surface leading from the outer end of the extended surface 480 to the line 53 at the lower mount 50. While surface 46 preferably terminates at the line 53, it may be carried somewhat further in if desired.

Extension 420, if it appears preferable in an individual case, for reasons of manufacture, for example, could also be formed as a rectangularly delimited parallelepiped, having a right outer edge extending approximately parallel to the optical axis 411 or the imaginary line 53. However, a shape of this type is not essential, as the surface 480, constituting a continuation of the curvature of surface 48 of block 42, directs the light rays from the object 413, as reflected by the mirror 47, in accordance with the ray course 400, and thus into the field of vision of eye 412. The extension 420 thus need be considered solely from the standpoint of optical requirements, only of wedge shape.

In all of the embodiments described above, it may occur that, during cementing of the parts together and as a result of insufficient care, undesired cement beads may be produced in the acute angle between the surface bearing the oblique mirror and the convex surface, or continuation thereof, of the central block of the viewfinder. In order to prevent such an occurrence, in accordance with a further embodiment of the invention, the oblique surface is so positioned that it does not extend to the convex surface of the central block of the viewfinder, but terminates within the plano-concave front lens thereof. In this instance, it is desirable to make this front lens of a plastic composition material so that it is possible to produce both the oblique surface and the adjoining concave surface in a known manner by casting.

Referring to FIG. 4, a viewfinder including a front lens 61 is illustrated therein as also including a central block 70 and a plano-convex ocular 63. Lens 61 is formed of a synthetic resin or plastic with the oblique surface 66 being formed therein during the casting of the lens 61. Surface 66 carries the mirror 67 which may be cemented thereto or formed thereon by metal vaporization in a vacuum, and adjoining the surface 66, and forming an acute angle therewith, is a curved convex surface 68 which has a radius of curvature equal to the radius of curvature of the convex surface 65 of central element 70 and along which the semi-transparent or semi-permeable mirror extends. However, under certain conditions and to meet certain special optical considerations as to refractive index, direction of the rays, etc., the curvature of surface 68 could differ from that of surface 65.

With this arrangement, the point, at which the ray 60, from the element whose position is to be observed, enters the viewfinder, is shifted somewhat forwardly in the viewing direction, as compared with the embodiments of FIGS. 1, 2, and 3, and the cementing of the front lens 61 to the central lens 70 takes place over the entire mating surfaces of these lenses. The acute angle or V notch formed between oblique surface 66 and convex surface 68 is therefore not touched by cement and cannot be impaired by beads of cement. In this instance, to protect the plastic lens 61, a thin glass plate 62 is cemented onto the plano-front face of this lens. As in other embodiments, a frame 64 is cemented between the convex surface of ocular 63 and a concave surface portion of central block 70. The eye of the viewer is indicated at 612, and the optical axis of the viewfinder is indicated at 611.

While specific embodiments of the invention have been shown and described in detail to illustrate the application of the principles of the invention, it will be understood that the invention may be embodied otherwise without departing from such principles.

What is claimed is:

1. In an "Albada" type viewfinder, for photographic cameras, including a front plano-concave lens, a central lens having a convex outer surface facing the concave surface of the front lens and a concave inner surface, an ocular having a convex surface facing the concave surface of the central lens, a semi-transparent mirror disposed between the adjacent surfaces of the front and central lenses, and a picture limiting frame disposed between the adjacent surfaces of the central lens and of the ocular: means for providing, in the field of view of an observer looking through the ocular, an image of the position of an exposure condition indicating element of the camera located extraneous to the viewfinder, said means consisting in the viewfinder itself of a surface formed on and integral with said front lens inwardly of the outer plane surface thereof and oblique to the optical axis of the viewfinder, and substantially completely within the lateral confines of the viewfinder; a convex surface area on and integral with one of said lenses, concentric with the convex outer surface of said central lens, and inwardly of and facing said oblique surface, forming an open V-notch therewith; and a mirror on said oblique surface operable to reflect the light rays from the indicating element through said convex surface area, said convex surface area, due to its light ray converging action, providing, in the field of view of a viewer looking into the viewfinder through said ocular and along the optical axis of the viewfinder, a sharply focused image of said element in addition to the sharply focused image of the subject to be photographed and of said picture limiting frame.

2. Albada viewfinder combination as claimed in claim 1 in which the angle of the oblique surface to such optical axis is so selected that the image of the element appears outside the picture limiting frame.

3. Albada viewfinder combination as claimed in claim 1 in which said convex surface area has the same radius as that of the semi-transparent mirror.

4. Albada viewfinder combination as claimed in claim 1 in which said convex surface area is coincident with the convex surface of the central lens.

5. Albada viewfinder combination as recited in claim 1, said front and central lenses and said ocular being asymmetric with respect to the optical axis thereof so that said front and central lenses project further in one direction from the optical axis than in the opposite direction therefrom, and said surface formed on and integral with said front lens being situated in the asymmetrically projecting portion thereof.

6. Albada viewfinder combination as claimed in claim 5 in which the asymmetrical portion of the central lens is tapered toward the ocular.

7. Albada viewfinder combination as claimed in claim 1 in which said front lens is formed of light-permeable synthetic resin, and said oblique surface lies entirely outwardly of the inner concave surface of said front lens.

8. Albada viewfinder combination as claimed in claim 7 in which said convex surface area intersects the inner end of said oblique surface.

9. Albada viewfinder combination as claimed in claim 1 in which said last-named mirror is arranged at an inclination, with respect to the optical axis of the viewfinder, of from 20 degrees to 65 degrees; said second named convex surface being formed on an element of material having an average refractive index, for yellow light, of from 1.4 to 1.7; and the radius of curvature of the convex outer surface of the central lens is between 20 mm. and 70 mm.

References Cited by the Examiner
UNITED STATES PATENTS

| | | | |
|---|---|---|---|
| 2,923,196 | 2/60 | Papke | 88—1.5 |
| 2,996,964 | 8/61 | Fischer et al. | 95—10 |
| 3,031,940 | 5/62 | Wilson. | |
| 3,043,180 | 7/62 | Papke | 88—1.5 |
| 3,091,167 | 5/63 | Estes. | |

FOREIGN PATENTS

| | | |
|---|---|---|
| 202,442 | 3/59 | Austria. |
| 648,955 | 8/37 | Germany. |
| 842,154 | 6/52 | Germany. |
| 855,944 | 11/52 | Germany. |
| 547,045 | 8/42 | Great Britain. |

DAVID H. RUBIN, *Primary Examiner.*

EMIL G. ANDERSON, *Examiner.*